Sept. 21, 1954
G. P. McCORD
2,689,377
INNER TUBE CURING MOLD
Filed Jan. 5, 1951
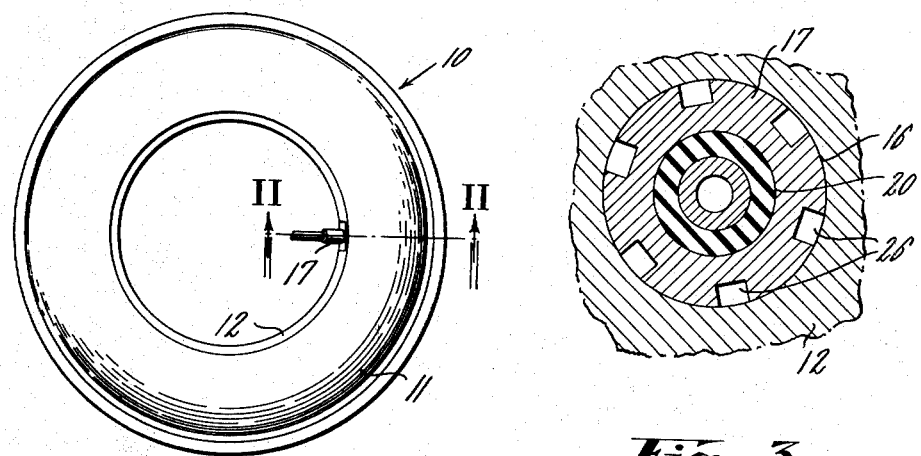
Fig. 1
Fig. 3
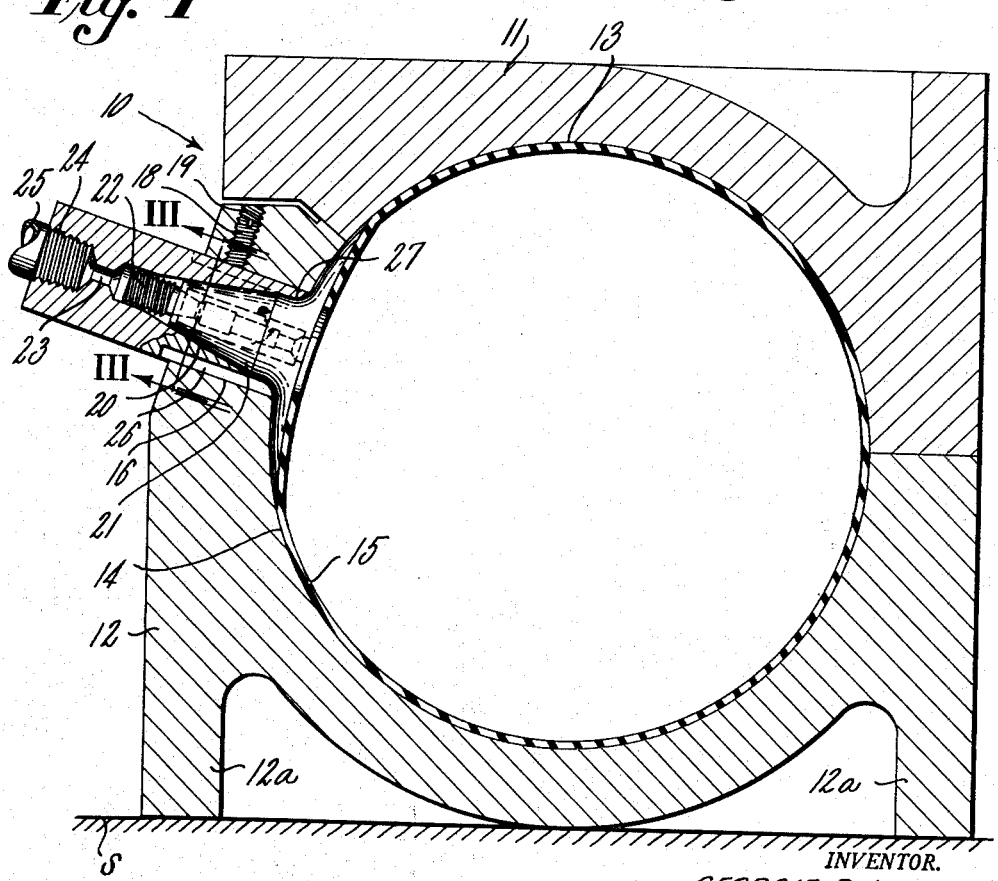
Fig. 2
INVENTOR.
GEORGIE P. McCORD
BY
Charles C. Willson
ATTORNEY Patented Sept. 21, 1954

2,689,377

UNITED STATES PATENT OFFICE 2,689,377

INNER TUBE CURING MOLD

Georgie P. McCord, Oaklandon, Ind., assignor to United States Rubber Company, New York, N. Y., a corporation of New Jersey Application January 5, 1951, Serial No. 204,561

5 Claims. (Cl. 18—38)

This invention relates to a mold for curing inner tubes for pneumatic tires which tubes have rubber covered valve stems, and more particularly to such a mold provided with means for accurately positioning the valve stem in the mold and for inflating the inner tube while it is in the mold without making a connection directly to the valve stem.

Heretofore, molds for curing inner tubes have been provided with an opening in the wall thereof through which the valve stem of the tube could be extended. In using such a mold, the tube was first partially inflated and placed in the cavity of the mold with the valve stem extending through the opening. An air hose was then attached directly to the end of the valve stem protruding from the opening and the tube inflated to the desired pressure. The air hose remained attached to the stem during the curing of the tube in the mold to maintain the pressure within the tube.

The air hose when attached to the valve stem during the curing of the tube exerted forces on the stem and tended to distort the rubber covering of the stem and also tended to pull the rubber covering away from the metal insert, with the result that many tubes had to be rejected after the curing operation because the rubber covering was distorted. In addition, the air hose had to be connected and disconnected for each inner tube that was cured which necessarily consumed both time and labor.

The present invention allows inner tubes to be inflated and cured without connecting the air hose directly to the valve, thereby eliminating the deleterious effect of having such a connection during the curing period. The present invention also eliminates the necessity of connecting and disconnecting the air hose to each inner tube to be cured thereby resulting in savings of time and labor.

In general, the invention consists of a curing mold for inner tubes which has a valve stem receiving and positioning chamber in its interior wall. The chamber communicates by means of a passage with connecting means on the exterior wall of the mold to which an air hose is attached. The rubber covering of the valve stem in engagement with the wall of the chamber seals the chamber and air entering the chamber from the passage is confined to flow through the hollow metal insert of the valve stem into the inner tube. As the pressure builds up within the tube, it presses the valve stem more tightly into the chamber thereby increasing the sealing effect of the rubber covering. Vent passages are provided in the wall of the mold adjacent the valve area to prevent air from being trapped between the inner tube and the interior wall of the mold.

In using the present invention, the air hose may be permanently attached to the exterior of the mold. The operator places a partially inflated tube to be cured into the mold and inserts the rubber covered valve stem into the chamber provided in the interior wall of the mold. The pressure within the tube is sufficient to hold the stem in place in the chamber and air entering the chamber flows through the metal insert of the valve stem and further inflates the tube. Any air that may have leaked past the valve stem when it was first inserted in the chamber is exhausted through the vents in the wall of the mold as the tube expands to fill the cavity of the mold. The seal between the rubber covered valve stem and the wall of the valve stem receiving chamber is effective to maintain the desired pressure within the inner tube during the curing thereof since this tight fit prevents leakage of air past the valve stem. The chamber properly positions the valve stem relative to the inner tube during the curing thereof and as no air hose connection is made directly to the valve stem there are no forces acting on the stem to distort it.

Other objects and advantages of the present invention will become apparent from the following description when read in conjunction with the accompanying drawing wherein:

Fig. 1 is a top plan view of the mold of the present invention;

Fig. 2 is a sectional view taken on the line II—II of Fig. 1; and

Fig. 3 is a sectional view taken on the line III—III of Fig. 2.

Referring to the drawing and in particular to Figs. 1 and 2, the inner tube curing mold 10 of the invention is shown as having an upper annular part 11 and a lower annular part 12. The lower part 12 is provided with annular supporting flanges 12a which serve to support the mold on a base S. As can be best seen in Fig. 2, the two parts 11 and 12 fit together so that the inner walls 13 and 14 respectively form a toroidal cavity which receives the inner tube 15 which is to be cured.

The lower mold part 12 has an opening 16 through the wall thereof which receives a plug 17. The plug 17 is secured in the opening 16 by means of a set screw 18 which is screwed into a threaded hole 19 in the wall of mold part 12 and which communicates with the opening 16.

The inner end of the plug 17 has an outwardly flaring tapered bore which forms a chamber 20 to receive and position a rubber covered valve stem 21 of the inner tube 15. The taper of the walls of the chamber 20 corresponds to the taper of the outer surface of the rubber valve stem so that as the valve stem is received in the chamber it will tightly engage the wall thereof. The bottom of the chamber 20 is made cylindrical to loosely receive the end of the hollow metal insert 22 of the valve stem 21.

Communicating with the chamber 20 is a passage 23 which communicates with an internally threaded opening 24 that receives the externally threaded end of an air hose 25. The air hose 25 is connected to a source of air under pressure (not shown). Air under pressure supplied to the hose 25, therefore, will flow through the passage 23 into the chamber 20.

When the rubber covered valve stem is inserted into the chamber 20, the rubber covering thereof engages the sidewall of the chamber and forms a seal, so that air under pressure entering the chamber is confined to flow through the hollow metal insert 22 of the valve stem 21 into the inner tube 15. The air is free to pass through the insert 22 as no valve core is provided therein during the curing operation so that the tube may be quickly deflated and removed from the mold after curing.

In using the mold, the upper part 11 is removed and the inner tube is partially inflated to facilitate handling thereof. The partially inflated tube is placed in the lower part 12 of the mold and is positioned so that the valve stem 21 extends into the chamber 20. The top part 11 of the mold is then placed in proper position. The initial inflation of the inner tube is sufficient to hold the valve stem 21 in the chamber 20.

Air under pressure supplied by the air hose 25, enters the chamber 20 and passes into the tube 15 through the hollow metal insert 22 of the valve stem 21. Initially some of the air will leak past the rubber covering of the valve stem 21 into the mold cavity between the inner tube and the inner walls 13 and 14 of the mold parts 11 and 12. As the pressure builds up within the inner tube 15, it will press the valve stem 21 more tightly into the chamber 20 and completely seal off the chamber and thereby prevent leakage past the valve stem 21.

To prevent the entrapment of air in the valve area between the inner tube 15 and the interior walls 13 and 14 of the mold, the exterior surface of the plug 17 is provided with vent passages in the form of longitudinal grooves 26 as best shown in Figs. 2 and 3. These grooves are of a length greater than the wall thickness of the mold part 12 so that any air between the inner tube 15 and walls 13 and 14 will escape to the exterior of the mold.

As can be seen in Fig. 2, the plug 17 is inserted in the opening 16 until its end is flush with the interior wall 14 of the mold part 12. The edge of the chamber 20 adjacent the end of the plug 17 is slightly beveled at 27 to correspond to the shape of the valve stem and to facilitate entry of the valve stem into the chamber 20.

While the valve stem positioning and air hose attachment structure 17 has been described and disclosed as a separate detachable unit, it is to be understood that this is merely the preferred embodiment and that such structure may be made as an intergral part of the mold and that modifications and changes could be made therein without departing from the spirit and the scope of the invention.

Having thus described my invention, what I claim and desire to protect by Letters Patent is:

1. A hollow mold for curing inner tubes having rubber covered valve stems, said mold having a valve stem receiving chamber in the interior wall thereof, said chamber being tapered inwardly from said interior wall so that the exterior rubber cover of said valve stem is wedged into intimate contact with the wall of the chamber and forms a seal when the tube is partially inflated to thereby restrict the flow of fluid from the chamber to passage through the valve stem, means on the exterior wall of said mold adapted to be connected to a source of fluid under pressure, a passage connecting said means and said chamber whereby the inner tube may be inflated while contained in the mold and vent passages through the wall of the mold in the region of said chamber to prevent air from being trapped between the tube and interior wall of the mold.

2. A hollow mold for curing inner tubes having rubber covered valve stems, said mold having an opening through the wall thereof, a plug in said opening, means for securing the plug in the opening with one end thereof flush with the interior wall of said mold, a valve stem receiving chamber in said one end of the plug, said chamber being tapered inwardly from said one end so that the exterior rubber cover of said valve stem is wedged into contact with the wall of the chamber and forms a seal when the tube is partially inflated to thereby restrict the flow of fluid from the chamber to passage through the valve stem, means on the other end of the plug for connecting the plug to a source of fluid under pressure, and a passage connecting said means and said chamber whereby the tube may be inflated while it is in the mold.

3. A hollow mold for curing inner tubes having rubber covered valve stems, said mold having an opening through said wall thereof, a plug in said opening, means for securing the plug in the opening with one end thereof flush with the interior wall of the mold, a valve stem receiving chamber in said one end of the plug, said chamber being tapered inwardly from said one end so that the exterior rubber cover of said valve stem is wedged into intimate contact with the wall of the chamber and forms a seal when the tube is partially inflated to thereby restrict the flow of fluid from the chamber to passage through the valve stem, means on the other end of the plug for connecting the plug to a source of fluid under pressure, a passage connecting said means and said chamber whereby the tube may be inflated while it is in the mold, and grooves in the outer surface of the plug which provide vent passages to prevent air from being trapped between the inner tube and the interior wall of the mold.

4. A plug adapted to be secured in an opening in the wall of an inner tube curing mold, said plug having a chamber in one end adapted to receive and position a rubber covered valve stem, said chamber being tapered inwardly from said one end, means on the other end of the plug to which an air hose may be connected, a passage in the plug connecting said chamber and said means, and grooves on the exterior surface of the plug to serve as vent passages when the plug is secured in the opening in the wall of the mold.

5. A hollow mold for curing inner tubes having rubber covered valve stems, said mold having a valve stem receiving chamber in the interior wall thereof, said chamber being tapered inwardly from said interior wall so that the exterior cover of said valve stem is wedged into intimate contact with the wall of the chamber and forms a seal when the tube is partially inflated to thereby restrict the flow of fluid from the chamber to passage through the valve stem, means on the exterior wall of the mold adapted to be connected to a source of fluid under pressure, and a passage connecting said means and said chamber whereby the inner tube may be inflated while contained in the mold.

References Cited in the file of this patent

UNITED STATES PATENTS

| Number | Name | Date |
|---|---|---|
| 1,394,547 | Greer | Oct. 25, 1921 |
| 1,395,944 | Brubaker | Nov. 1, 1921 |
| 1,435,113 | Gammeter | Nov. 7, 1922 |
| 1,695,013 | Glidden et al. | Dec. 11, 1928 |
| 1,812,821 | De Mattia | June 30, 1931 |
| 1,931,649 | Eger | Oct. 24, 1933 |
| 2,094,347 | Cady | Sept. 28, 1937 |
| 2,230,879 | Bronson | Feb. 4, 1941 |
| 2,452,382 | Long | Oct. 26, 1948 |
| 2,490,328 | Van Fleet | Dec. 6, 1949 |